April 18, 1967
W. BILLI
3,315,005
PROCESS AND DEVICE FOR QUENCHING AND REMOVING TARS
AND CARBON BLACK FROM A PYROLYSIS GAS OBTAINED
IN THE PRODUCTION OF ACETYLENE
Filed Aug. 26, 1963
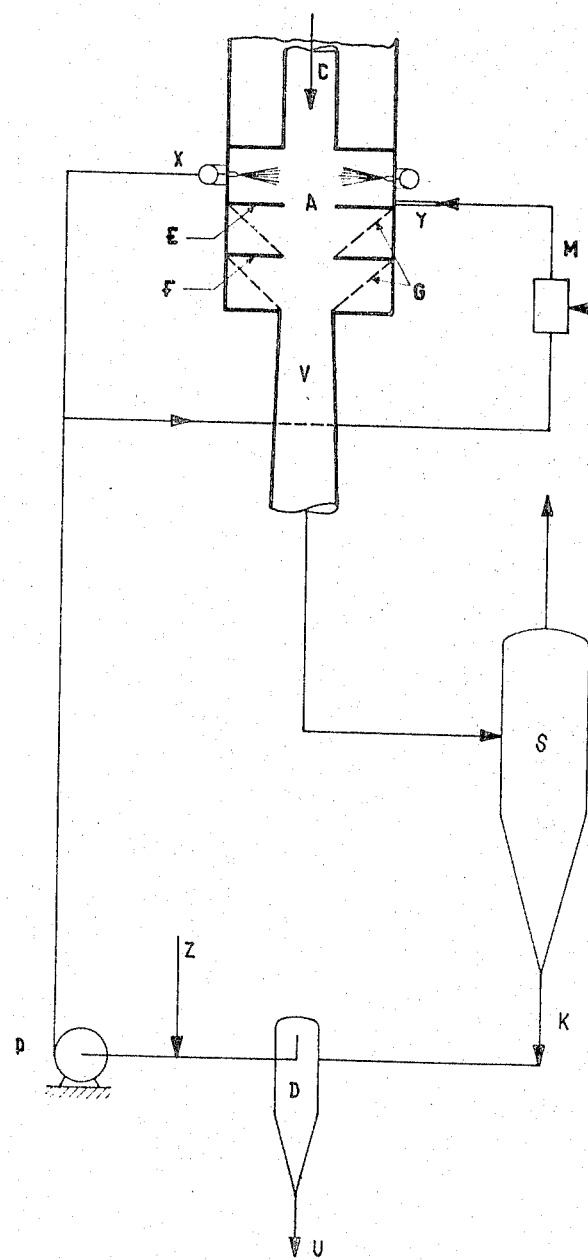
INVENTOR.
Walter Billi

3,315,005
PROCESS AND DEVICE FOR QUENCHING AND REMOVING TARS AND CARBON BLACK FROM A PYROLYSIS GAS OBTAINED IN THE PRODUCTION OF ACETYLENE

Walter Billi, Milan, Italy, assignor to Montecatini Edison S.p.A., Milan, Italy
Filed Aug. 26, 1963, Ser. No. 304,420
Claims priority, application Italy, Aug. 30, 1962, 17,219/62
5 Claims. (Cl. 260—679)

It is known that production of acetylene and ethylene by pyrolysis of natural gas, methane, and/or gasoline by cracking and partial combustion with oxygen is always accompanied by the formation of tars and/or carbon black. It is also known that the pyrolysis gases, obtained by a very rapid increase of the temperature of the hydrocarbon introduced into the reactor, are immediately cooled with water at the reactor outlet in order to stabilize the acetylene formed.

My invention has as an object, a device which makes possible carrying out both the rapid cooling of the pyrolysis gases and the removal of tar and carbon black from said gases by intimately mixing water, sent to the device, with the pyrolysis gases, at the expense of the energy, dissipated by the pyrolysis gases, per se, in the form of intense vortex movements.

As is known, it is possible to "wet" both the tar products and the carbon black by water since, due to the high temperature of the pyrolysis gases entering the device, the tar products are not yet agglomerated into the form of droplets but are still in the gaseous stage when they come in contact with and form emulsions with the water introduced into the device. Furthermore, due to the high temperature of the pyrolysis gases introduced into the device, carbon black, if any, is not yet coated with tarry substances and, therefore, can readily be wetted by the water introduced into said device.

I have found that for success of the "wetting" operation, it is necessary that the vortex movement not only be sufficiently intense but be in a particular arrangement so as to obtain intimate contact with the water and gas. The device according to my invention comprises a series of restricted portions followed by sharply widened portions of the passage section for the pyrolysis gases after the so-called quenching step which may be with water or other quenching fluid, such as oil in a pyrolysis burner such as shown in my copending application Ser. No. 41,197 filed July 6, 1960, now Patent No. 3,220,803.

The invention is illustrated by way of example, without limitation however, by the accompanying drawing.

A diagrammatically shows a special water-and-gas mixing device consisting of a chamber having a plurality of diaphragms, which provide successive widened and restricted passageways in the direction of the flow path of the pyrolysis gases. More particularly, the pyrolysis gas coming from a reaction chamber C is introduced into the mixing chamber A and is placed into a whirling movement by baffles E and F. The gases of the mixing chamber A leave said chamber as a suspension in water introduced through line X and not yet vaporized. This suspension is sent to separator S through conduit V, which conduit has a slightly outward conical shape. In separator S, which may be a cyclone separator as schematically depicted in the drawing, the liquid is separated from the gas and, loaded with the tarry substances and carbon black, leaves the separator through conduit K while the product leaves through L.

The operation in mixing chamber A is actually carried out in two steps: (a) water introduced into the device quickly evaporates thereby saturating the gas under pressure and temperature conditions corresponding to those of the cooled gas; this water may also be introduced by means of a series of spray nozzles according to the classical quenching techniques. (b) Non-evaporated water is intimately contacted with the gas by the sequence of widened and restricted portions of section A and depicted at E and F. These restricted portions further may be conical as shown in the drawing by dotted line G. The number of restrictions depends upon the actual working conditions, that is to say, it depends upon the variations of the flow rate of the pyrolysis gas. A single restriction is suitable when the gas flow rate remains constant, whereas the use of two or more restrictions makes possible the use of gas having varying flow rates within sufficiently wide limits without undue pressure losses.

The water in step (b) for contacting the gas may be introduced separately from that of the actual quench water of step (a). When the water is separately introduced, it is possible to add to the water, a suitable additive to absorb the tarry substances and which has a large affinity for both the tarry substances and carbon black. Examples of such materials are hydrated lime and bentonite. The water is introduced through conduit H into vessel M, wherein the water is mixed with lime or bentonite, etc. This mixture is then introduced through conduit Y into vessel A. Lime and bentonite and other materials (e.g. alum) which are known per se in water purification techniques for the removal of oily and tarry products may be used according to my invention. If an additive such as lime is used, the water leaving S instead of being discharged and subjected to a purifying operation in a separate plant, may be sent through a liquid-solid separator D in which the heavier portion of the sludge mixture containing the additive, tars and carbon black is separated through conduit U from the liquid portion by the action of the vortical movement within the apparatus. The clarified liquid, even if containing a small portion of the sludge, can be recycled to device A through pump P. Make-up water can be added to the suction side of the pump to saturate any water which may be lost as a result of saturation of the pyrolysis gas.

Example 1

In a plant for the production of 60 tons per day of acetylene from gasoline, the device described hereinabove is used making possible the simultaneous quenching of the pyrolysis gases and removal of tars. This was done by circulating water containing hydrated lime. The operating conditions were as follows:

Mixing device consisting of 3 diaphragms connected at the restricted portions with truncated cones having a ratio between the diameters of the two bases of 1:2.5.

| | |
|---|---:|
| Water introduced through X (see the drawing) _____m.$^3$/hr__ | 60 |
| Lime solution introduced through Y (see the drawing) _____m.$^3$/hr__ | 10 |
| Lime consumption _____kg./hr__ | 250 |
| Pyrolysis gas leaving the reaction chamber: | |
| Flow-rate (dry gas) _____Nm.$^3$/hr__ | 26,000 |
| Temperature _____° C__ | 1,400 |
| Pressure (absolute atmospheres) ____ata__ | 10 |
| Tars _____kg./hr__ | 100 |
| Pyrolysis gas leaving separator S: | |
| Flow-rate (dry gas) _____Nm.$^3$/hr__ | 26,000 |
| Temperature _____° C__ | 167 |
| Pressure _____ata__ | 9.9 |
| Tars _____ | Absent |

Example 2

The device of my invention was utilized in a plant for the production of 50 tons per day of actylene from methane, thereby simultaneously carrying out the quenching of the pyrolysis gases and the tar removal using a circulating water plus lime. The operating conditions were as follows:

Mixing device consisting of 2 diaphragms connected at the narrowing with truncated cones having a ratio between the two bases of 1:3.

| | |
|---|---|
| Water introduced through X (see the drawing) _____m.³/hr__ | 42.5 |
| Lime solution introduced through Y (see the drawing) _____m.³/hr__ | 20 |
| Lime consumption _____kg./hr__ | 140 |
| Pyrolysis gas leaving the reaction chamber: | |
| Flow-rate (dry gas) _____Nm.³/hr__ | 23,850 |
| Temperature _____° C__ | 1,500 |
| Pressure _____ata__ | 4 |
| Tars _____kg./hr__ | 71 |
| Pyrolysis gas leaving separator S: | |
| Flow-rate (dry gas) _____Nm.³/hr__ | 23,850 |
| Temperature _____° C__ | 130 |
| Pressure _____ata__ | 3.9 |
| Tars _____ | Absent |

The optimum dimensions of the baffle sections should be such that the speed in the restricted passageways should be from 50 to 200 m./sec. and the speed in the widened passageways should decrease to a speed of 10 to 50 m./sec.

I claim:
1. A device for simultaneous quenching and removal of tars and carbon black from an acetylene-production pyrolysis gas, which consists of a series of restrictions in the passage leading from a pyrolysis burner to provide a series of restricted and widened portions, a quenching means between the first of said restrictions and said burner section, said restricted and widened portion being so dimensioned that the speed of the cooled and saturated pyrolysis gas in the restricted portion is 50 to 200 m./sec. and the speed in the widened portion decreases to 10 to 50 m./sec.

2. A device for simultaneous quenching and removal of tars and carbon black from an acetylene-production pyrolysis gas, which consists of a series of restrictions in the passage leading from a pyrolysis burner to provide a series of restricted and widened portions, a quenching means between the first of said restrictions and said burner section, the widened portion being connected with the restricted portion by means of reversed truncated cones whose smaller diameter corresponds to the restricted portion and whose greater diameter corresponds to the widened portion, said restricted and widened portion being so dimensioned that the speed of the cooled and saturated pyrolysis gas in the restricted portion is 50 to 200 m./sec. and the speed in the widened portion decreases to 10 to 50 m./sec.

3. A process for quenching and removing tars and carbon black from acetylene pyrolysis gas, which comprises quenching said pyrolysis gas and immediately passing said quenched gas through a series of restricted passageways so that the speed within the restricted area is between 50 and 200 meters per second and the speed in the widened sections is from 10 to 50 meters per second.

4. A process for quenching and removing tars and carbon black from acetylene pyrolysis gas, which comprises quenching said pyrolysis gas, washing said quenched gas, passing said washed gas through a series of restricted passageways so that the speed within the restricted area is between 50 and 200 meters per second and the speed in the widened sections is from 10 to 50 meters per second, adding an absorbing agent to the water used in said washing step to absorb the tars and carbon black, and separating the acetylene gas from said water.

5. A process for quenching and removing tars and carbon black from acetylene pyrolysis gas, which comprises quenching and washing said pyrolysis gas, passing said gas through a series of restricted passageways so that the speed within the restricted area is between 50 and 200 meters per second and the speed in the widened sections is from 10 to 50 meters per second, adding a sorbant to the wash water to absorb the tars and carbon black, separating the acetylene gas from said water, and separating the tars and carbon black from said aqueous suspension and recycling clarified water to said quenching step.

References Cited by the Examiner

UNITED STATES PATENTS

| | | | |
|---|---|---|---|
| 2,179,379 | 9/1939 | Metzger | 260—679 |
| 2,767,233 | 10/1956 | Mullen et al. | 260—679 |
| 2,945,075 | 12/1960 | Schofield | 260—679 |
| 2,974,180 | 3/1961 | Kobel et al. | 260—679 |
| 2,982,794 | 5/1961 | Davison | 260—679 |

ALPHONSO D. SULLIVAN, *Primary Examiner.*